(12) United States Patent
Sauner et al.

(10) Patent No.: US 7,226,039 B2
(45) Date of Patent: Jun. 5, 2007

(54) HOIST ASSEMBLY FOR A MOTOR VEHICLE SPARE TIRE

(75) Inventors: Marvin H. Sauner, Vandalia, OH (US);
Paul J. Rado, Jr., Franklin, OH (US);
Jack D. Spencer, Vandalia, OH (US)

(73) Assignee: Troy Engineered Components and Assemblies Corporation, Troy, OH (US)

( * ) Notice: Subject to any disclaimer, the term of this patent is extended or adjusted under 35 U.S.C. 154(b) by 0 days.

(21) Appl. No.: 11/224,507

(22) Filed: Sep. 12, 2005

(65) Prior Publication Data

US 2007/0063174 A1   Mar. 22, 2007

(51) Int. Cl.
*B66D 1/04*   (2006.01)
(52) U.S. Cl. .................. 254/323; 254/342; 254/903
(58) Field of Classification Search .............. 254/323, 254/325, 327, 333, 342, 344, 376, 903
See application file for complete search history.

(56) References Cited

U.S. PATENT DOCUMENTS

| | | | | |
|---|---|---|---|---|
| 2,053,976 A | * | 9/1936 | Stahl | 254/375 |
| 4,535,973 A | * | 8/1985 | Dorr et al. | 254/323 |
| 4,625,947 A | * | 12/1986 | Denman et al. | 254/323 |
| RE33,303 E | | 8/1990 | Denman et al. | |
| 4,969,630 A | * | 11/1990 | Denman et al. | 254/323 |
| 5,100,106 A | * | 3/1992 | Denman et al. | 254/323 |
| 5,125,628 A | * | 6/1992 | Rempinski et al. | 254/323 |
| 5,228,661 A | * | 7/1993 | Bigham et al. | 254/276 |
| 5,290,014 A | | 3/1994 | Ferglson, Jr. | |

\* cited by examiner

*Primary Examiner*—Emmanuel Marcelo
*Assistant Examiner*—Evan Langdon
(74) *Attorney, Agent, or Firm*—Jacox, Meckstroth & Jenkins

(57) ABSTRACT

The compact hoist assembly includes a housing having a molded plastic body sandwiched between parallel spaced metal plates, and an upper portion of the housing projects into an elongated mounting channel. The housing supports a rotary drive shaft which supports an annular rotary spool defining a groove receiving a cable having an inner end portion connected to the spool. A drive mechanism connects the shaft to the spool through a spring biased clutch and produces one revolution of the spool for multiple revolutions of the drive shaft. A down stop member moves radially within the groove while engaging the cable, and an alternate one-piece down stop member surrounds the cable and engages the spool on opposite sides of the groove. An elongated tire support bracket is connected to the outer end of the cable and has opposite inclined straight surfaces for self-centering wheels with center holes of different diameters.

5 Claims, 4 Drawing Sheets

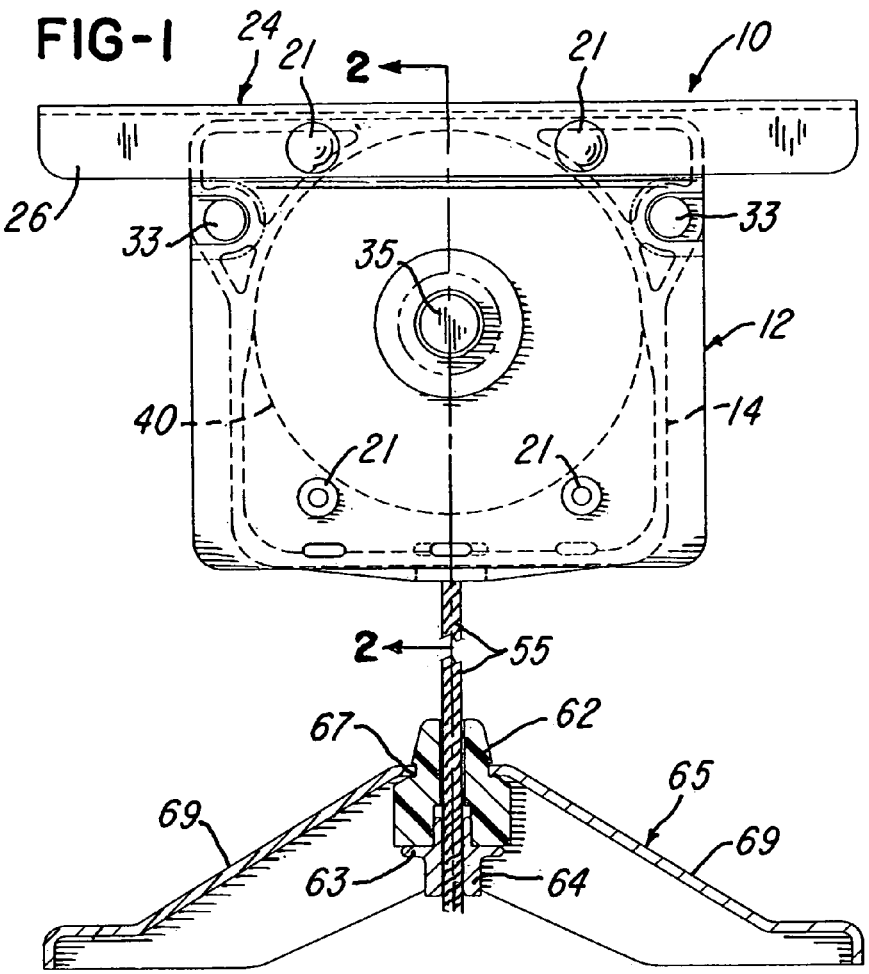
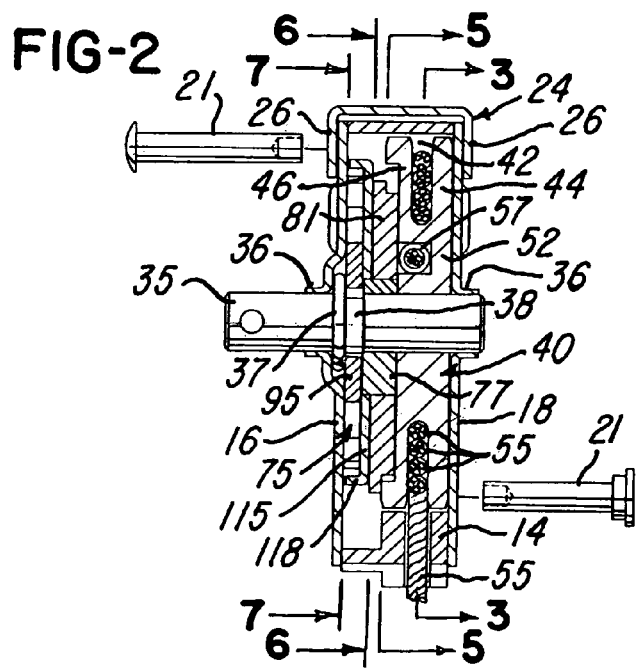

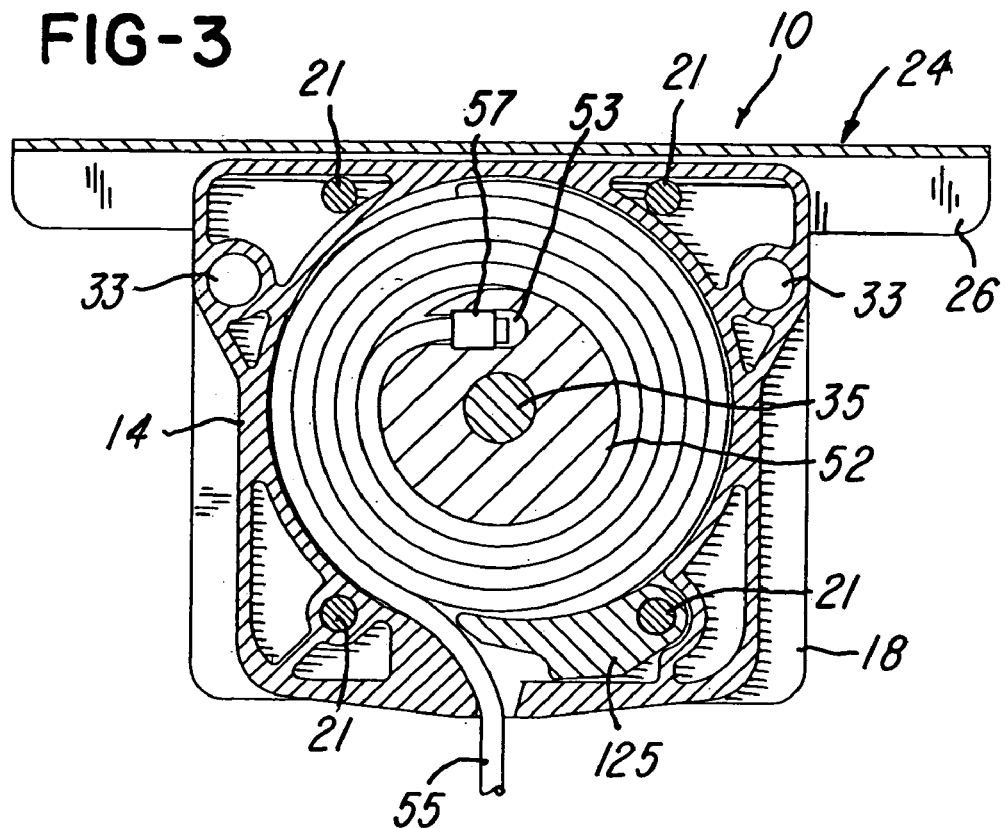
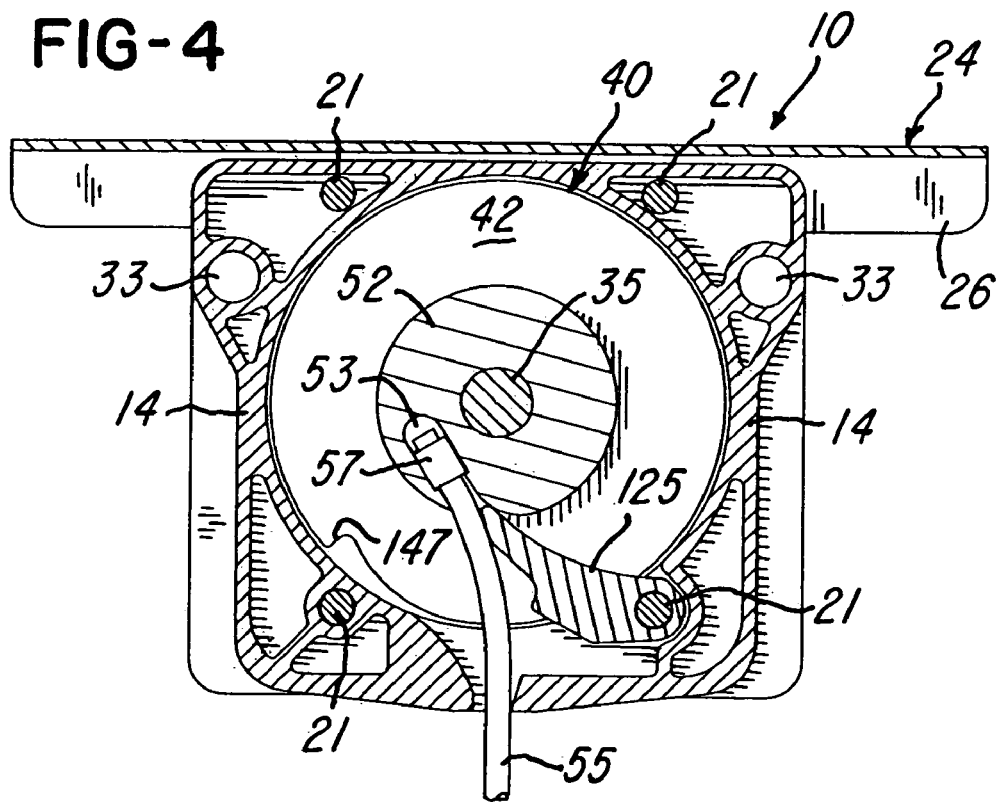

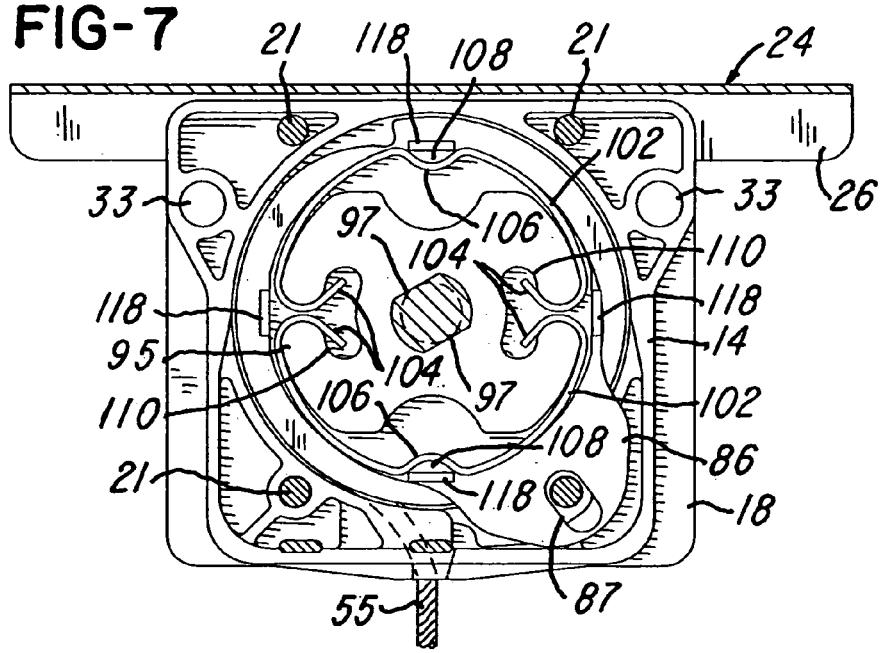
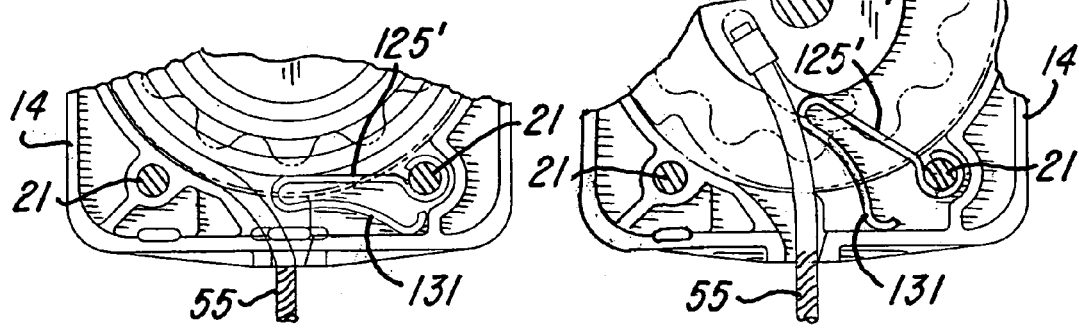
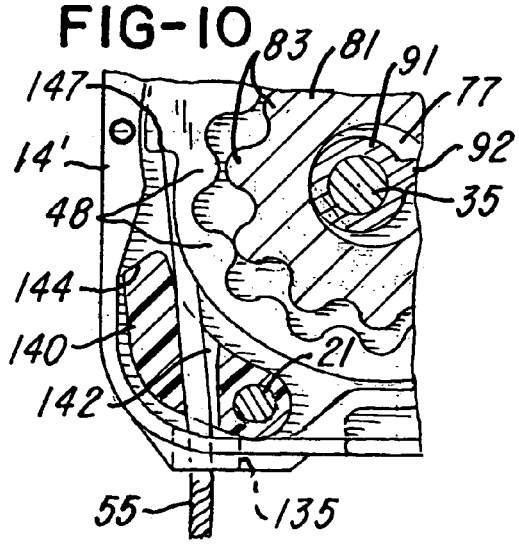
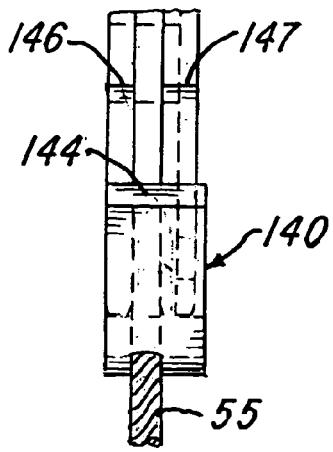

HOIST ASSEMBLY FOR A MOTOR VEHICLE SPARE TIRE

BACKGROUND OF THE INVENTION

This invention relates to a compact lift unit or hoist assembly for raising and lowering a spare tire and wheel assembly for a motor vehicle and of the general type disclosed in U.S. Pat. No. 5,290,014 and No. RE 33,303, the disclosures of which are herein incorporated by references. In such a spare tire lift unit or hoist assembly, it has been found desirable for some vehicles to have a center exit opening in the housing for the depending cable and to incorporate a down stop system which prevents continued rotation of the spool after the cable has been fully extended. It has also been found desirable to provide the unit or hoist assembly with a dependable spring clutch mechanism which assures that a substantially constant tension will be maintained within the tire support cable when the cable and wheel assembly are fully retracted and also prevents overloading of the hoist assembly when the cable is retracted and extended.

When it is necessary for the lift unit or hoist assembly to have a side cable exit opening within the housing for some installations, it is desirable to have a dependable down stop system which is durable and positively prevents continued rotation of the spool when the cable is fully extended. It has also been found desirable to have the outer or lower end portion of the cable carry a wheel engaging and support member or bracket which will accommodate and self-center a variety of different wheels having center holes with different diameters.

SUMMARY OF THE INVENTION

The present invention is directed to an improved compact tire lift unit or hoist assembly for use in raising and lowering a spare tire and wheel assembly for motor vehicles and which provides all of the desirable structural features mentioned above in addition to providing a significant increase in durability and dependability. In accordance with one embodiment of the invention, a hoist assembly includes a housing formed by a molded plastic shroud or body sandwiched between two parallel spaced flat metal plates. An upper portion of the housing projects into a downwardly facing elongated mounting channel which has opposite end portions projecting from the housing for conveniently mounting the hoist assembly on a motor vehicle.

The housing supports a center drive shaft for rotation, and the drive shaft supports an annular reel or spool for relative rotation. The spool has a circumferential groove for receiving and confining a wound cable, and inwardly projecting internal gear teeth are formed as an integral part of the spool. A high ratio drive mechanism connects the drive shaft to the spool and includes an orbital gear plate mounted on an eccentric cam and having external gear teeth for sequentially engaging the internal gear teeth on the spool. The drive mechanism also includes a clutch plate driven by the shaft and supporting a pair of arcuate flat wire springs having circumferentially spaced recesses which receive two of four ears or tabs projecting axially from a clutch disc which drives the eccentric cam within the orbital gear plate.

A down stop member is supported by the housing for pivotal movement within the cable receiving groove and engages the cable during unwinding of the cable until the down stop member wedges between the cable and the spool hub. The down stop member thereby prevents further rotation of the spool after the cable is fully extended. The lower or outer end portion of the cable supports an elongated wheel engaging bracket having diametrically opposite straight inclined surfaces each of which extends substantially longer than the width of the bracket. The bracket accommodates and self-centers wheels having a range of center pilot holes of different diameters. In a modification, the housing has a side housing exit opening for the cable, and a one-piece molded plastic down stop has an internal passage which receives the cable and engages two axially aligned stop surfaces on the spool on opposite sides of the cable groove.

Other features and advantages of the invention will be apparent from the following description, the accompanying drawings and the appended claims.

BRIEF DESCRIPTION OF THE DRAWINGS

FIG. 1 is a side elevation view of a hoist assembly constructed in accordance with the invention and with a wheel support plate shown in section;

FIG. 2 is a vertical section taken generally on the line 2—2 of FIG. 1;

FIG. 3 is a section taken generally on the line 3—3 of FIG. 2 and showing the cable fully wound and retracted;

FIG. 4 is a section similar to FIG. 3 and showing the cable fully extended with the down stop member engaged;

FIG. 7 is a section taken generally on the line 7—7 of FIG. 2 and showing the clutch assembly;

FIGS. 8 and 9 are fragmentary sections similar to FIGS. 3 and 4 and showing a modified down stop member constructed in accordance with the invention;

FIG. 10 is a fragmentary section showing a modification of the invention with an external down stop member for a side exit cable; and FIG. 11 is a fragmentary view of the external down stop member and spool.

DESCRIPTION OF ONE EMBODIMENT

Figure 5:
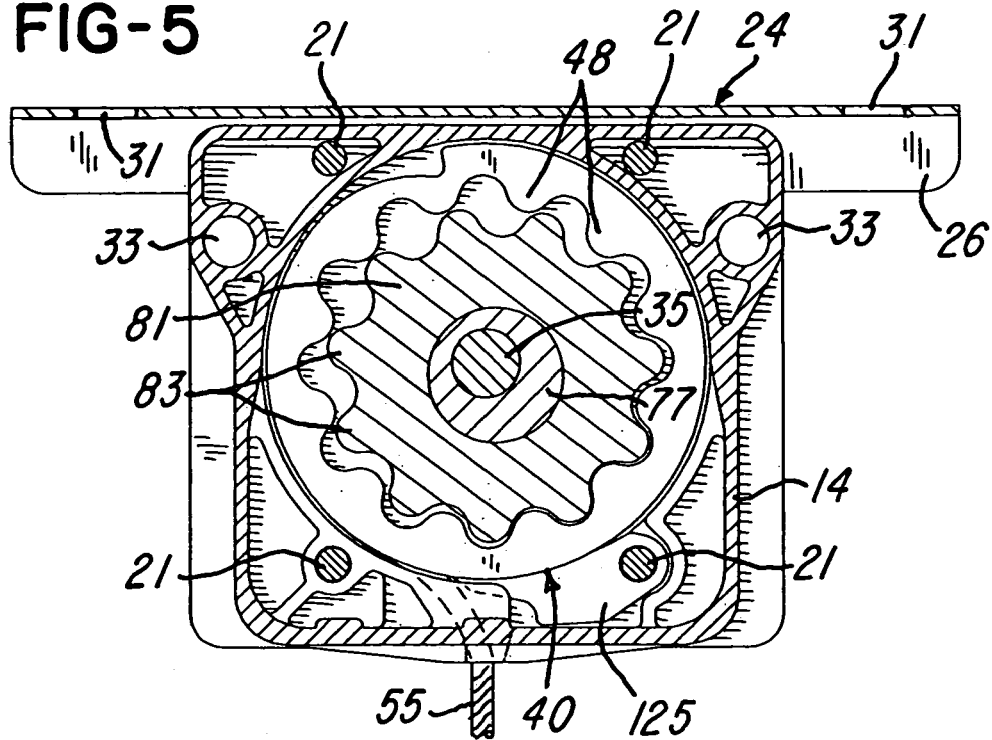
FIG. 5 is a section taken generally on the line 5—5 of FIG. 2 and showing the driven eccentric cam and the external and internal gears.

Referring to FIG. 1, a compact spare tire lift unit or hoist assembly 10 includes a generally square housing 12 formed by a body 14 molded of a rigid plastics material and sandwiched between a pair of metal side plates 16 and 18. The body 14 and side plates 16 and 18 are secured together by a pair of lower rivets 21 having flared tubular end portions, and an upper end portion of the housing 12 projects into an elongated mounting channel 24 having parallel spaced flanges 26 secured to the upper portion of the housing 12 by another pair of rivets 21. The channel 24 has opposite end portions which project from the housing 12 and have corresponding holes 31 (FIG. 5) for securing the hoist assembly 10 to a motor vehicle chassis or component. The housing side plates 16 and 18 and the body 14 also have a pair of spaced holes 33 which are adapted to receive cross pins or bolts for stabilizing the unit.

Referring to FIG. 2, the housing 12 supports a drive shaft 35 for rotation within tubular portions 36 of the side plates 16 and 18. The shaft is formed with an integral collar 37 and diametrically opposed flat surfaces 38. The shaft 35 supports an annular reel or spool 40 which is preferably formed of powdered metal and has a circumferential slot or groove 42 defined between integrally connected spaced walls 44 and 46 of the spool 40. Referring to FIG. 5, the wall 46 of the spool 40 also defines a plurality of 12 circumferentially spaced and inwardly projecting rounded teeth 48. The spool 40 has a circular center hub 52 (FIGS. 3 and 4) with an undercut recess or cavity 53 projecting axially from only one side surface of the spool into the groove 42.

Referring to FIG. 3, an elongated steel cable 55 is spirally wound on the hub 52 within the groove 42 of the spool 40 and has an inner end portion connected to a crimped sleeve or collar 57 confined within the undercut cavity 53. As shown in FIG. 1, an outer end portion of the cable 55 receives a molded plastic bushing 62 which is retained on the cable by a metal fitting 63 having a tubular portion 64 crimped to the end portion of the cable. The bushing 62 carries an elongated and generally rectangular wheel support member or lift plate 65 which is drawn from sheet steel and has a center hole 67 receiving the bushing 62 with a snap-fit connection. The support member or lift plate 65 has a length of about 7 inches and a width of about 1¾ inches and is formed with two diametrically opposite inclined or sloping surfaces 69 each of which has a straight length substantially greater than the width of the bracket or about 2⅕ inches. The support plate 65 is adapted to be tilted and inserted into the center pilot hole of a motor vehicle wheel (not shown) which carries a spare tire (not shown). Each of the inclined surfaces 69 slopes downwardly from the center hole 67 at an angle of about 30° such as 32°, and is slightly arcuate across the width of the bracket.

Figure 6:
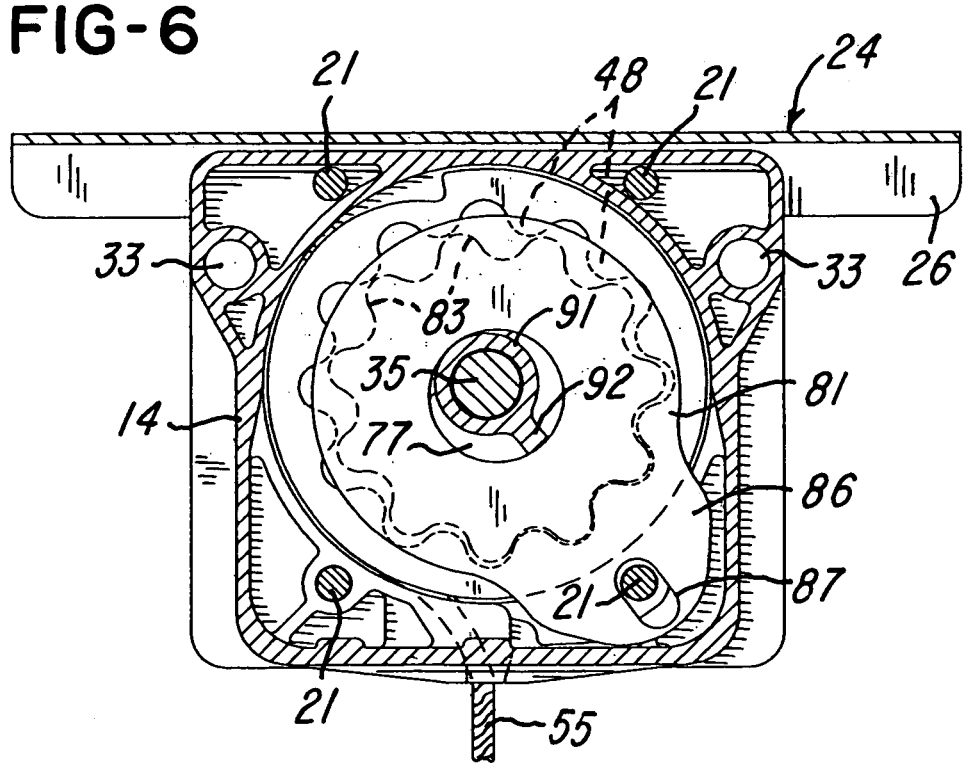
FIG. 6 is a section taken generally on the line 6—6 of FIG. 2 and showing the configuration of the external gear plate.

The spool 40 is driven or rotated within the housing 12 in opposite directions to extend and retract the cable 55 in response to a high reduction drive mechanism 75 (FIG. 2) which includes a rotary eccentric cam 77 (FIGS. 2 and 5) supported by the shaft 35 for relative rotation. An external gear plate 81 is mounted on the cam 77 and has a plurality of eleven circumferentially spaced and outwardly projecting rounded external teeth 83 which sequentially engage the internal teeth 48 on the spool 40 when the gear plate 81 orbits in response to rotation of the eccentric cam 77 within the gear plate. As shown in FIG. 6, the gear plate 81 has an integral wide tab portion 86 which projects radially outwardly into a corner portion of the housing 12. The tab portion 86 has a width about equal to the radius of the spool 40 and has an enclosed slot 87 which receives one of the rivets 21. The rivet 21 prevents the gear plate 81 from rotating, and the slot 87 permits the gear plate 81 to orbit in response to rotation of the cam 77. Preferably, the gear plate 81 is formed of powdered metal so that the external gear teeth 83 are integral with the tab portion 86. The cam 77 is also formed of powdered metal and includes an axially projecting ring 91 (FIG. 6) and radial key 92.

The drive mechanism 75 also includes a clutch mechanism formed by a flat clutch plate 95 (FIG. 7) having a center hole with diametrically opposed flat surfaces 97 and which mate with the flat surfaces 38 of the shaft 35 so that the clutch plate 95 is driven by the shaft. The clutch plate 95 carries a pair of diametrically opposite and generally semi-circular or arcuate flat wire springs 102 each of which has inwardly projecting curved end portions 104 and an intermediate curved portion 106. The spring portions 106 define diametrically opposite recesses 108, and the curved end portions 104 of the springs 102 are captured within T-shaped cavities 110 formed within the clutch plate 95.

Referring to FIG. 2, a circular sheet metal clutch disc 115 is confined between the clutch plate 95 and the gear plate 81 and has a keyhole-shaped center opening which receives the projecting ring 91 and key 92 formed on the cam 77 so that the clutch disc 115 drives or rotates the cam 77 on the shaft 35. As shown in FIGS. 2 and 7, the clutch disc 115 has a plurality of four circumferentially spaced tabs or ears 118, two of which project axially into the corresponding recesses 108 defined by the clutch springs 102 and two of which are located adjacent the curved end portions 104 of the springs. Thus when the shaft 35 is rotated to extend or retract the cable 55, the driven clutch disc 115 normally rotates with the clutch plate 95 as a result of the two ears 118 projecting into the recesses 108.

Referring to FIGS. 3 and 4, a flat metal down stop finger or member 125 has a thickness slightly less than the width of the groove 42 and is pivotally supported by one of the lower rivets 21 for generally radial movement between an outer retracted position (FIG. 3) and an inwardly projecting inner position (FIG. 4). As apparent from FIGS. 3 and 4, the down stop member 125 follows the cable 55 and pivots inwardly as the cable is being extended until the cable is fully extended (FIG. 4) when the down stop member 125 wedges between the cable 55 and the hub 52 of the spool 40. Thus the down stop member 125 prevents further counter-clockwise rotation (FIG. 4) of the spool and thereby prevents reverse wrapping of the cable 55 within the spool. When the cable is fully extended, further rotation of the shaft 35 and the clutch plate 95 causes the springs 102 to deform or springs inwardly so that the springs slip past the tabs or ears 118, and the clutch disc 115 does not rotate. When the cable 55 is retracted and wound within the groove 42 in response to clockwise rotation (FIG. 3) of the spool 40, the down stop member 125 rides radially outwardly on the cable to an outer retracted position, shown in FIG. 3.

Referring to FIGS. 8 and 9, an alternate or modified form of a down stop member or finger 125' is constructed of flat spring wire and is pivotally supported by a rivet 21 for movement between an outer position (FIG. 8) and an inner position (FIG. 9) as the cable 55 is being extended. The down stop member 125' includes a spring portion or leg 131 which engages the housing body 14 so that the down stop member continuously urges a radially inward force or pressure against the cable 55 as it is being wound and unwound on the spool 40. As a result of this continuous friction pressure, the down stop member 125' assures the cable 55 is never loose and winds snugly on the hub 52 of the spool 40.

FIGS. 10 and 11 illustrate a modified housing body 14' which has a side exit opening 135 for the cable 55. A molded one-piece plastic external down stop member 140 is pivotally supported within a corner portion of the housing body 14' by a rivet 21. The stop member 140 has an internal hole or passage 142 through which the cable 55 is threaded and is also molded with a stop surface 144 which extends across the full thickness of the spool 40, as shown in FIG. 11. When the cable 55 is fully extended, the inner and portion of the cable pivots the down stop member 140 clockwise (FIG. 10) until the stop surface 144 engages axially aligned stop surfaces 146 and 147 formed on the walls 44 and 46 of the spool 40, as shown in FIGS. 4 and 11. As a result, the down stop member 140 positively prevents the spool 40 from further rotation and thereby prevents reverse winding of the cable within the spool. When the cable 55 is retracted by clockwise rotation of the spool 40 (FIG. 10), the stop member 140 is cammed outwardly by the outer surfaces of the walls 44 and 46 until the stop member is in its retracted position shown in FIG. 10.

From the drawings and the above description, it is apparent that an improved tire lift unit or hoist assembly constructed in accordance with the invention, provides desirable features and advantages. For example, the construction and operation of the down stop member 125 or 125' provide a positive stop against further rotation of the spool 40 when the cable 55 is fully extended while also providing for a center exit of the cable from the housing. As another advantage, the one-piece stop member 140 (FIGS. 10 and 11) and its engagement with the stop surfaces 146 and 148 provides for a positive, durable and dependable stop to the rotation of the spool 40 when the cable is fully extended from a side exit opening within the housing. In addition, the modified spring-type stop member 125' shown in FIGS. 8 and 9 provides for a continuous inward radial pressure against the cable 55 as the cable is being wound and unwound on the spool 40, thereby assuring that the cable is always firmly wound on the spool even when the cable is not supporting a spare tire and wheel assembly. As a further advantage, the four tabs or ears 118 on the clutch disc 115 provide for more rapid and dependable actuation of the clutch mechanism in the event the operator continues to rotate the drive shaft 35 after the cable is fully retracted or extended. The specific shape of the wheel lift plate 65 also provides for self-centering a variety of different wheels having center holes of different diameters.

While the forms of hoist assembly herein described constitute preferred embodiments of the invention, it is to be understood that the invention is not limited to these precise forms of hoist assemblies, and that changes may be made therein without departing from the scope and spirit of the invention as defined in the appended claims.

What is claimed is:

1. In a hoist assembly adapted for raising and lowering a spare tire on a motor vehicle, comprising a housing having spaced side walls supporting a drive shaft for rotation, an annular spool supported by said shaft within said housing for rotation relative to said shaft and defining a circumferential groove surrounding a hub, an elongated flexible cable having a first end portion connected to said hub of said spool and extending through an opening within said housing, a tire support member connected to an opposite second end portion of said cable, a drive mechanism connecting said shaft to said spool and effected to rotate said spool through one revolution relative to said shaft in response to multiple revolutions of said shaft for winding said cable within said groove, and a down stop member supported within said housing for pivotal movement into said groove on an axis disposed radially outwardly from said spool, the improvement wherein said down stop member has an inner end portion engaging said cable, said inner end portion of said down stop member being confined between adjacent portions of said cable at all times while said end portion of said down stop member moves radially inwardly within said groove in response to unwinding of said cable from said spool, and said end portion of said down stop member wedges between said first end portion of said cable and said hub for positively stopping rotation of said spool when said cable is fully extended through said opening within said housing.

2. A hoist assembly as defined in claim 1 wherein said down stop member comprises an elongated spring metal element forming a V-shaped resilient spring member, and said spring member having one end portion engaging said housing and a second end portion supported by a cross-pin for said pivotal movement.

3. A hoist assembly as defined in claim 1 wherein said tire support member comprises an elongated bracket having a substantially uniform width and a center hole, said bracket having a pair of diametrically opposite straight and smooth uninterrupted surfaces extending outwardly and downwardly in opposite directions from said center hole, each of said surfaces extending at an angle of about thirty degrees relative to an axis of said center hole and having a length substantially greater than said width of said bracket, and said sloping surfaces providing for automatic self-centering of different spare tire wheels having center holes of different diameters.

4. A hoist assembly as defined in claim 1 and including an elongated metal mounting channel having longitudinally extending parallel spaced flanges receiving said housing therebetween, a set of fasteners extending through corresponding aligned holes within said flanges and said housing, said elongated mounting channel having opposite end portions projecting longitudinally outwardly in opposite directions from said housing, and said end portions of said channel having holes for receiving fasteners to provide a high strength support for said hoist assembly and for conveniently securing said hoist assembly to the vehicle.

5. A hoist assembly as defined in claim 1 wherein said spool has a center hub integrally connecting parallel spaced side walls defining said groove, and a closed end blind cavity extending axially through only one side of said side walls into said groove and receiving said first said end portion of said cable.

* * * * *